United States Patent [19]
Kamlukin et al.

[11] 4,048,788
[45] Sept. 20, 1977

[54] ROTARY POWER MOWER WITH IMPROVED CLUTCH AND BRAKE MECHANISM

[75] Inventors: Igor Kamlukin, Mequon; Joseph R. Harkness, Germantown, both of Wis.

[73] Assignee: Briggs & Stratton Corporation, Wauwatosa, Wis.

[21] Appl. No.: 703,843

[22] Filed: July 9, 1976

[51] Int. Cl.² ............................................ A01D 69/08
[52] U.S. Cl. .................................... 56/11.3; 56/11.8; 56/DIG. 4; 74/209; 192/4 R
[58] Field of Search ................. 56/11.3, 11.8, DIG. 4; 192/14, 17 R, 4 R; 74/209

[56] References Cited
U.S. PATENT DOCUMENTS 2,742,750   4/1956   Funk ...................................... 56/11.3

*Primary Examiner*—Jay N. Eskovitz
*Attorney, Agent, or Firm*—Ira Milton Jones & Associates

[57] ABSTRACT

A rotary power mower in which the cutter blade is fixed to the bottom of a cup-shaped rotor, freely rotatably suspended from a carriage that is slidably mounted for fore and aft movement beneath the deck of the mower chassis. The carriage is spring-urged to a position in which the outer face of the side wall of the cup-shaped rotor is frictionally engaged with a brake shoe fixedly carried by the mower chassis, to hold the cutter blade against turning; and a deadman control mounted on the handle of the mower and operatively connected with the carriage enables the operator to move the carriage against the force of the spring to a position in which the inner face of the side wall of the cup-shaped rotor is tangent to and frictionally engaged with the periphery of a drive wheel fixed to the engine drive shaft.

12 Claims, 3 Drawing Figures

U.S. Patent  Sept. 20, 1977  Sheet 2 of 2  4,048,788
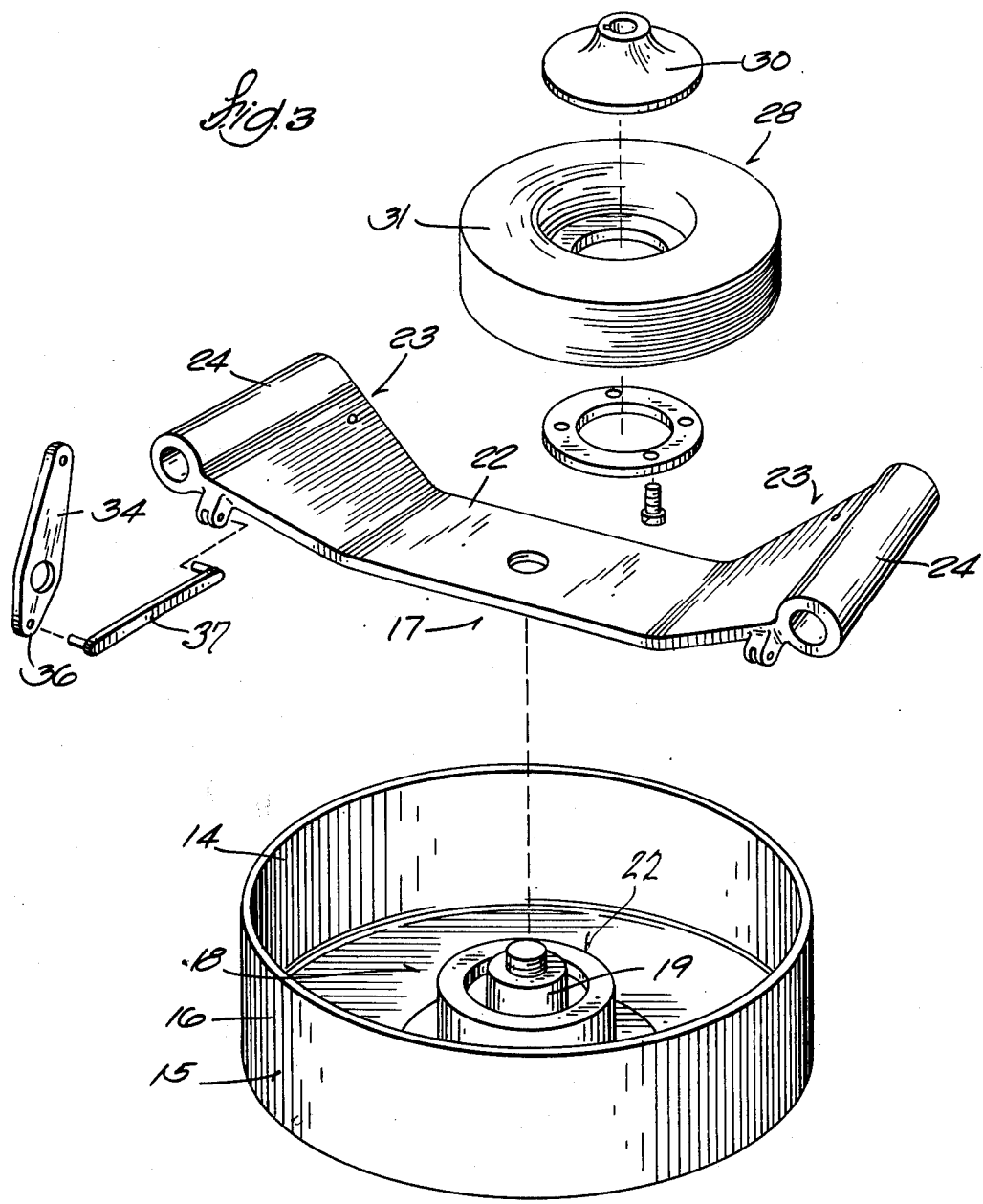

ROTARY POWER MOWER WITH IMPROVED CLUTCH AND BRAKE MECHANISM

This invention relates to power lawn mowers and refers more particularly to the so-called walk-behind rotary mowers having a wheeled chassis with a horizontal deck, an engine mounted on the deck and an engine-driven cutter blade below the deck.

Although the chassis of such mowers are designed to prevent accidental contact of an operator's hand or foot with the rapidly rotating cutter blade, no degree of ingenuity in the design of mower chassis has succeeded in making it impossible for an operator to deliberately — and foolishly, of course — insert his hand or foot into the path of the revolving blade.

In an effort to minimize that danger, various schemes have been devised to interrupt the driving connection between the engine and the cutter blade, and even stop the blade, when the mower is stopped as it must be to remove and empty the grass collecting bag with which these mowers are generally equipped. Examples of prior ways of achieving this objective will be found in the following patents:

| | |
|---|---|
| Funk | 2,742,750 |
| Musgrave | 2,960,810 |
| Dowdle | 2,985,992 |
| Hoff | 3,026,665 |
| Nemeth et al | 3,247,654 |
| Meldahl 3,253,391 | |
| Rubin | 3,367,459 |
| Hauser | 3,414,094 |
| De Baillie | 3,543,892 |
| Seifert et al | 3,802,170 |

To what extent any of the mowers of the above identified patents attained commercial success is not known, but it is safe to assume that few, if any, have enjoyed that distinction. For the most part, the mechanisms employed in those mowers to selectively drivingly connect the cutter blade with the engine and to stop rotation of the blade when that driving connection was disrupted, were too complicated to be practicable and reliable.

With a view to overcoming the deficiencies of prior attempts to equip rotary power mowers with the needed safeguards, the present invention has as its purpose to provide a simple and completely reliable combination clutch and brake by which power to the cutter blade is selectively established or interrupted, and by which rotation of the blade is stopped within an infinitesimally short interval after the clutch is disengaged.

A significant feature of the clutch of this invention is its speed reducing capability which enables the engine to operate at its most efficient speed, while the speed of the cutter blade driven thereby is slow enough to meet established safety standards.

It is also an object of the invention to govern the functioning of the combination clutch and brake mechanism by a deadman control on the handle of the mower, which must be held in a predetermined position for the cutter blade to be drivingly connected with the engine and, upon being released, results in the blade being stopped practically instantaneously.

As will be more fully described hereinafter, the invention achieves its objectives by attaching the cutter blade to the underside of a rigid cup-shaped rotor that is freely rotatably suspended from a carriage mounted in the chassis of the mower for fore and aft reciprocation between defined positions. In one of those positions, the outer face of the side wall of the cup-shaped rotor is frictionally engaged with a brake shoe fixedly mounted in the chassis. A spring reacting between the carriage and the chassis yieldingly urges the latter towards that position, and a deadman control mounted on the handle of the mower and operatively connected with the carriage, enables the operator to move the carriage in opposition to the spring to its other defined position in which the inner face of the side wall of the cup-shaped rotor is tangentially frictionally engaged with the periphery of a drive wheel fixed to the drive shaft of the engine.

The tangential frictional engagement of the inner side wall surface of the cup-shaped rotor with the periphery of the drive wheel not only provides a very simple, rugged and higly reliable clutch for drivingly coupling the rotor blade with the engine, but — by selection of the relative diameters of the drive wheel and the rotor — provides any desired speed reduction. That clutch is engaged only when the operator holds the deadman control in its active position. Release of the deadman control results in immediate engagement of the outer side wall surface of the rotor with the brake shoe, so that before the operator can move his hands from the deadman control to the mouth of the grass discharge chute or the bag attached thereto, rotation of the cutter blade has been stopped, without of course stopping the engine.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 3 is an exploded perspective view of certain of the major parts of the structure by which the cutter blade is mounted.

Figure 2:
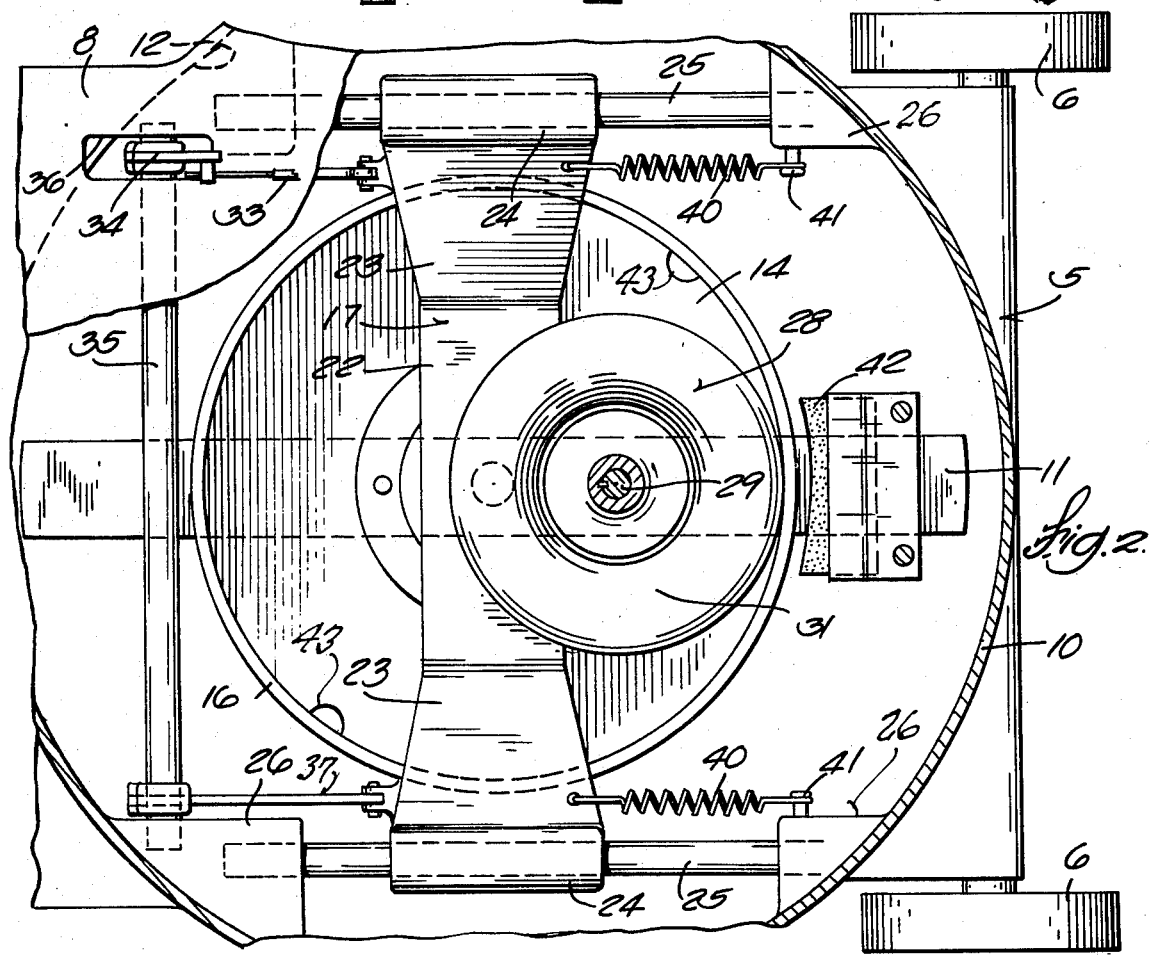
FIG. 2 is a top view of the mower with its engine omitted and a considerable portion of the chassis deck broken away and some of the illustrated parts in section.

Referring to the accompanying drawings, the numeral 5 designates the chassis of a more-or-less conventional power rotary lawn mower, which — as is customary — rides on wheels, two of which identified by the numeral 6 are shown in FIG. 2, and has a vertical shaft engine 7 mounted on its deck 8. The mower may be of the self-propelled type, in which event certain of its wheels are drivingly connectable with the engine under control of the operator, but in any event the mower is of the walk-behind variety with a handle 9 projecting upwardly and rearwardly from the chassis, by which the operator guides the mower; and, if it is not self-propelled, also pushes it across the lawn.

Figure 1:
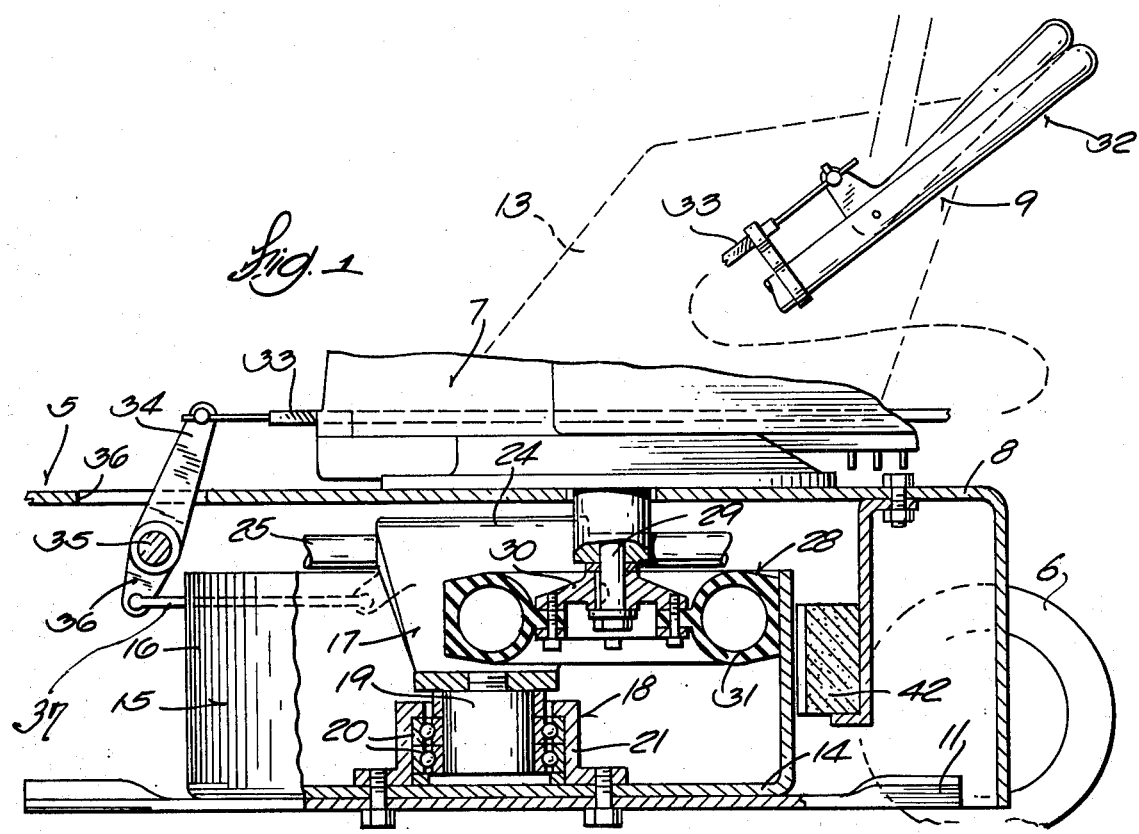
FIG. 1 is a vertical sectional view through that portion of a rotary power lawn mower with which the invention is especially concerned.

The chassis has the usual skirt 10 depending from the edge of the deck 8 to coact therewith in forming a protective enclosure for the rotary cutter blade 11 of the mower. At one side of the mower the chassis deck and skirt are shaped to provide a discharge chute 12 through which the grass clippings debouch during operation of the mower, and to which a bag 13, indicated in dotted lines in FIG. 1, may be detachably secured to catch the clippings.

The manner in which the cutter blade 11 is mounted and driven is distinctly not conventional. As shown in the drawings, the blade extends diametrically across and is secured to the underside of the bottom wall 14 of a cup-shaped rotor 15, the side wall 16 of which is cylindrical. This rotor is freely rotatably suspended from a carriage 17 by means of a bearing structure 18 that comprises a journal 19 fixed to and projecting down from the carriage, and superimposed ball bearings 20. The inner race of each of these ball bearings is fixedly seated on the journal 19, and the outer race is received in a circular cage 21 that is coaxially secured to the bottom wall 14 of the rotor 15.

As best seen in FIG. 3, the carriage 17 has a substantially flat medial portion 22 that extends substantially diametrically across the bottom wall 14 of the rotor at a level below the edge of its sidewall. At the opposite ends of this medial portion 22 there are upwardly directed end portions 23 which reach to a level above the top edge of the rotor side wall and then project thereacross to terminate in bored sleeves 24. These sleeves are slidably mounted on parallel rods 25, the ends of which are anchored in bosses 26 formed on the chassis side wall 10. In this manner, the carriage 17 — and hence the rotor suspended therefrom — is mounted for fore and aft reciprocation with respect to the chassis.

One of the significant features of the invention is its simple highly efficient clutch by which driving torque is transmitted from the engine to the cutter blade. It consists of a drive wheel 28 fixed to the downwardly projecting end portion 29 of the engine drive shaft and located below the deck of the chassis within the hollow of the cup-shaped rotor 17. Whenever the engine is running, the drive wheel is turning, so that as the carriage is slid in one direction, the inner surface of the rotor side wall is tangentially and frictionally engaged with the periphery of the drive wheel.

Although the drive wheel may take any suitable form, preferably it consists of a metal disc 30, the hub of which is keyed and fixed to the engine drive shaft, and a pneumatic tire 31 encircling and mounted on the disc to form the peripheral portion of the drive wheel. Obviously, when the rotor 17 and the drive wheel are in the aforesaid engagement, the "clutch" by which driving torque is transmitted from the engine to the cutter blade is engaged.

To effect that engagement, a deadman control 32 that is pivotally mounted on the mower handle is operatively connected with the carriage 17. The connection between the deadman control and the carriage conveniently comprises a flexible sheathed cable 33, commonly known as a Bowden wire, that leads from the deadman control to a lever 34. The lever 34 is fixed to a cross shaft 35 rockably mounted in the chassis below its deck, and projects upwardly through a hole 36 in the deck so that its outer end to which the cable is attached is above the chassis deck.

Also fixed to the cross shaft 35 are two downwardly projecting levers 36, the extremities of which are connected with the sleeves 24 of the carriage by links 37. A pull on the deadman control thus slides the carriage in the direction to engage the "clutch" and drivingly connect the cutter blade with the engine.

A pair of tension springs 40 connected between the sleeves of the carriage and anchor pins 41 on the chassis oppose engagement of the clutch by a pull on the deadman control, and upon release of the deadman control these springs pull the carriage in the direction to disengage the rotor from the drive wheel 28, i.e. disengage the clutch, and quickly stop rotation of the blade by securely holding the outer face of the rotor side wall 16 against a brake shoe 42 that is fixedly mounted on the chassis under its deck. Engagement of the rotor with the brake shoe practically instantaneously stops rotation of the rotor and the cutter blade fixed thereto. It follows, therefore, that upon release of the deadman control, rotation of the blade is automatically and very rapidly stopped.

As noted hereinbefore, the clutch of this invention enables the engine to run at its most efficient speed, while the speed of the rotary cutter blade driven thereby is sufficiently slower to satisfy the safety codes that government has imposed upon the lawn mower industry.

Since the drive wheel must be smaller in diameter than the cup-shaped rotor to enable the latter to be encircled by the former and shifted radially with respect thereto, this desirable speed reduction is inherent in the design of the clutch; and by appropriate selection of the relative diameters of the drive wheel and the rotor, any practical speed reduction ratio can be obtained.

Holes 43 in the bottom of the cup-shaped rotor provide outlets for water that might accumulate in the rotor.

Those skilled in the art will appreciate that modifications in the embodiment of the invention illustrated and described herein can be made without departing from the essentials of the invention. To illustrate, the carriage on which the blade-carrying rotor is freely rotatably mounted, need not be linearly shiftable, but could be arranged to swing in an arc about a fixed pivot. In either case, the carriage would be constrained to move in a defined path to carry the inner face of the cylindrical side wall of the cup-shaped rotor into and out of tangential frictional engagement with the periphery of the drive wheel on the engine drive shaft, or engage the outer face of the rotor side wall with the brake shoe.

The invention is defined by the following claims.

We claim:

1. In a rotary power lawn mower having a wheeled chassis with a deck, a prime mover mounted on the deck with a drive shaft thereof projecting downwardly into the space below the deck, and a rotary cutter blade below the deck, improved clutch mechanism for drivingly connecting the cutter blade with said drive shaft, comprising:

A. a drive wheel drivingly connected with and driven by said drive shaft, said drive wheel being located below the deck of the chassis and constrained to rotate about a substantially vertical axis that is fixed with respect to the chassis;

B. a ring fixed with respect to the cutter blade, said ring having internal and external circular surfaces, the diameter of each of which is larger than that of the drive wheel;

C. a carriage;

D. means movably mounting said carriage on the chassis and constraining the same to bodily movement in opposite directions along a defined path transverse to the axis of the drive wheel;

E. bearing means freely rotatably mounting the ring on said carriage with the ring encircling the drive wheel and its axis parallel to that of the drive wheel, so that upon bodily movement of the carriage in one direction the internal circular surface of the ring is tangentially and frictionally engaged with the periphery of the drive wheel to establish a torque transmitting connection between the prime mover and the cutter blade; and F. manually operable means for effecting bodily movement of the carriage in said direction.

2. The invention defined by claim 1, further characterized by
   a brake shoe fixed to the chasis in position to be engaged by the outer circular surface of the ring upon bodily movement of the carriage in the opposite direction.

3. The invention defined by claim 2, further characterized by
   biasing means reacting between the carriage and the chassis and yieldingly urging the carriage in said other direction so that upon cessation of force restraining said biasing means, the latter acts to effect braking engagement between the ring and the brake shoe.

4. The invention defined by claim 1, wherein said mower is of the walk-behind variety and has a handle projecting from its chassis, and further characterized by
   a deadman control movably mounted on the handle of the mower for movement to and from an operative position,
   and motion transmitting means operatively connecting said deadman control with the carriage, and through which actuation of the deadman control towards its operative position effects bodily movement of the carriage in the direction to establish a torque transmitting connection between the prime mover and the cutter blade.

5. The invention defined by claim 3, wherein said mower is of the walk-behind variety and has a handle projecting from its chassis, and further characterized by:
   a deadmean control movably mounted on the handle of the mower for movement to and from an operative position; and
   motion transmitting means operatively connecting said deadman control with the carriage, and through which actuation of the deadman control to its operative position bodily moves the carriage to its position in which a torque transmitting connection is established between the prime mover and the cutter blade, release of the deadman control enabling said biasing means to move the carriage bodily in the opposite direction and thereby automatically effect braking engagement between the external circular surface of the ring with the brake shoe.

6. The invention defened by claim 5, wherein said ring is the side wall of a cup-shaped rotor.

7. The invention defined by claim 6, wherein the cutter blade extends diametrically across and is secured to the bottom wall of the cup-shaped rotor.

8. The invention defined by claim 1, wherein said means mounting the carriage on the chassis constrains the carriage to linear reciprocation.

9. The invention defined by claim 8, wherein said means mounting the carriage on the chassis comprises parallel track means fixed to the chassis, and track engaging means on the carriage slidably mounted on said track means.

10. The invention defined by claim 9, wherein said prime mover is a vertical shaft internal combustion engine fixed to the deck of the mower chassis, and said drive shaft is the lower portion of the engine crankshaft;
    and wherein said drive wheel, rotor, carriageand mounting for the carriage are all located below the deck of the chassis.

11. The invention defined by claim 1, wherein said drive wheel comprises a disc fixed to the drive shaft, and a pneumatic tire mounted on said disc and forming the periphery of the drive wheel.

12. In a rotary power lawn mower having a wheeled chassis with a deck, a prime mover mounted on the deck with a drive shaft thereof projecting downwardly into the space below the deck, and a rotary cutter blade below the deck, the mower having a handle projecting from its chassis, an improved combination clutch and brake mechanism including a deadman control on the handle, for drivingly connecting the rotary cutter blade with the prime mover as long as the operator holds the deadman control in its operative position and for automatically stopping rotation of the cutter blade without stopping the prime mover when the operator releases the deadman control, said improved clutch and brake mechanism being characterized by:

A. a drive wheel located below the deck of the chassis, drivingly connected with said drive shaft and constrained to rotation about a fixed vertical axis;

B. a rotor fixed with respect to the cutter blade, said rotor having a substantially cylindrical wall larger in diameter than that of the drive wheel;

C. means freely rotatably mounting said rotor below the deck of the chassis with its axis parallel to that of the drive shaft and its substantially cylindrical side wall encircling the drive wheel, and for bodily movement thereof radially with respect to the axis of the drive wheel;

D. a brake shoe fixed at the underside of the chassis deck in position to be engaged by the outer surface of the substantially cylindrical wall of the rotor when the latter is bodily moved in one direction;

E. spring means reacting between the chassis and the means mounting the rotor for bodily movement, yieldingly urging the latter in the direction to effect braking engagement of the rotor with the brake shoe; and F. motion transmitting means operatively connecting the deadman control with the means by which the rotor is freely rotatably mounted, through which maintenance of the deadman control in its operative position restrains the rotor from contact with the brake shoe and drivingly connects it with said drive wheel.

* * * * *